US012581198B2

(12) United States Patent
Tabei

(10) Patent No.: US 12,581,198 B2
(45) Date of Patent: Mar. 17, 2026

(54) CONTROL APPARATUS, APPARATUS, CONTROL METHOD, AND STORAGE MEDIUM

(71) Applicant: CANON KABUSHIKI KAISHA, Tokyo (JP)

(72) Inventor: Kunihiko Tabei, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 321 days.

(21) Appl. No.: 18/350,793

(22) Filed: Jul. 12, 2023

(65) Prior Publication Data

US 2024/0048851 A1 Feb. 8, 2024

(30) Foreign Application Priority Data

Aug. 3, 2022 (JP) ................................. 2022-123723

(51) Int. Cl.
H04N 23/71 (2023.01)
G06V 10/141 (2022.01)
H04N 23/74 (2023.01)

(52) U.S. Cl.
CPC ........... H04N 23/71 (2023.01); G06V 10/141 (2022.01); H04N 23/74 (2023.01)

(58) Field of Classification Search
CPC ........ H04N 23/71; H04N 23/74; H04N 7/183; G06V 10/141; G06V 20/56; B60R 2300/40; B60R 1/20
See application file for complete search history.

(56) References Cited

U.S. PATENT DOCUMENTS

2016/0159280 A1* 6/2016 Takazawa .............. B60K 35/50
345/8
2016/0365068 A1* 12/2016 Sakaguchi ............. B60K 35/23

FOREIGN PATENT DOCUMENTS

JP 2007-022454 A 2/2007
JP 2012-134845 A 7/2012

* cited by examiner

*Primary Examiner* — Timothy J Henn
*Assistant Examiner* — Angel L Garces-Rivera
(74) *Attorney, Agent, or Firm* — Carter, DeLuca & Farrell LLP

(57) ABSTRACT

A control apparatus is to be moved with a moving apparatus and configured to control luminance of an image to be displayed on a display unit acquired by an imaging unit. The control apparatus comprising a memory storing instructions, and a processor configured to execute the instructions to obtain information about a position of a moving body in the image, and determine the luminance of the image based on the position of the moving body.

5 Claims, 7 Drawing Sheets

CONTROL APPARATUS, APPARATUS, CONTROL METHOD, AND STORAGE MEDIUM

BACKGROUND

Technical Field

One of the aspects of the embodiments relates to a control apparatus, an apparatus, a control method, and a storage medium.

Description of Related Art

Conventionally, vehicles have been known that use as a rearview mirror or a side mirror (wing mirror) a rearview apparatus called an electronic mirror for displaying an image acquired using a camera on a display unit. Since the electronic mirror displays the image on the display unit based on the luminance (brightness) of the entire image acquired using the camera, the visibility may be reduced due to the improper luminance at a position where the vehicle driver wants to check.

Japanese Patent Laid-Open No. 2012-134845 discloses a luminance control method for a front-view (surveillance) camera. Japanese Patent Laid-Open No. 2007-22454 discloses a method of correcting an overexposure phenomenon of a rearview camera.

The method disclosed in Japanese Patent Laid-Open No. 2012-134845 can correct the luminance of a front-view image based on prediction using a front-view image that is currently being captured, but cannot properly control the luminance of a rearview image because the correction is made with the predicted luminance. The method disclosed in Japanese Patent Laid-Open No. 2007-22454 performs dimming correction at a correction position of a rearview image by predicting overexposure using only a screen upper part where the headlight is located, and cannot correct the luminance at a proper position. Therefore, in the methods disclosed in Japanese Patent Laid-Open Nos. 2012-134845 and 2007-22454, the visibility of the target (moving body) may decrease.

SUMMARY

A control apparatus according to one aspect of the disclosure is to be moved with a moving apparatus and configured to control luminance of an image to be displayed on a display unit acquired by an imaging unit. The control apparatus comprising a memory storing instructions, and a processor configured to execute the instructions to obtain information about a position of a moving body in an image, and determine the luminance of the image based on the position of the moving body. An apparatus including the above control apparatus, a control method corresponding to the control apparatus, and a non-transitory computer-readable storage medium storing the above control method also constitute another aspect of the disclosure.

Further features of the disclosure will become apparent from the following description of embodiments with reference to the attached drawings.

DESCRIPTION OF THE EMBODIMENTS

In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or programs that, when executed by the CPU, cause the CPU to perform operations corresponding to units or functions. In the hardware context, the term "unit" refers to a hardware element, a circuit, an assembly, a physical structure, a system, a module, or a subsystem. Depending on the specific embodiment, the term "unit" may include mechanical, optical, or electrical components, or any combination of them. The term "unit" may include active (e.g., transistors) or passive (e.g., capacitor) components. The term "unit" may include semiconductor devices having a substrate and other layers of materials having various concentrations of conductivity. It may include a CPU or a programmable processor that can execute a program stored in a memory to perform specified functions. The term "unit" may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

Referring now to the accompanying drawings, a detailed description will be given of embodiments according to the disclosure.

First Embodiment

Figure 1:
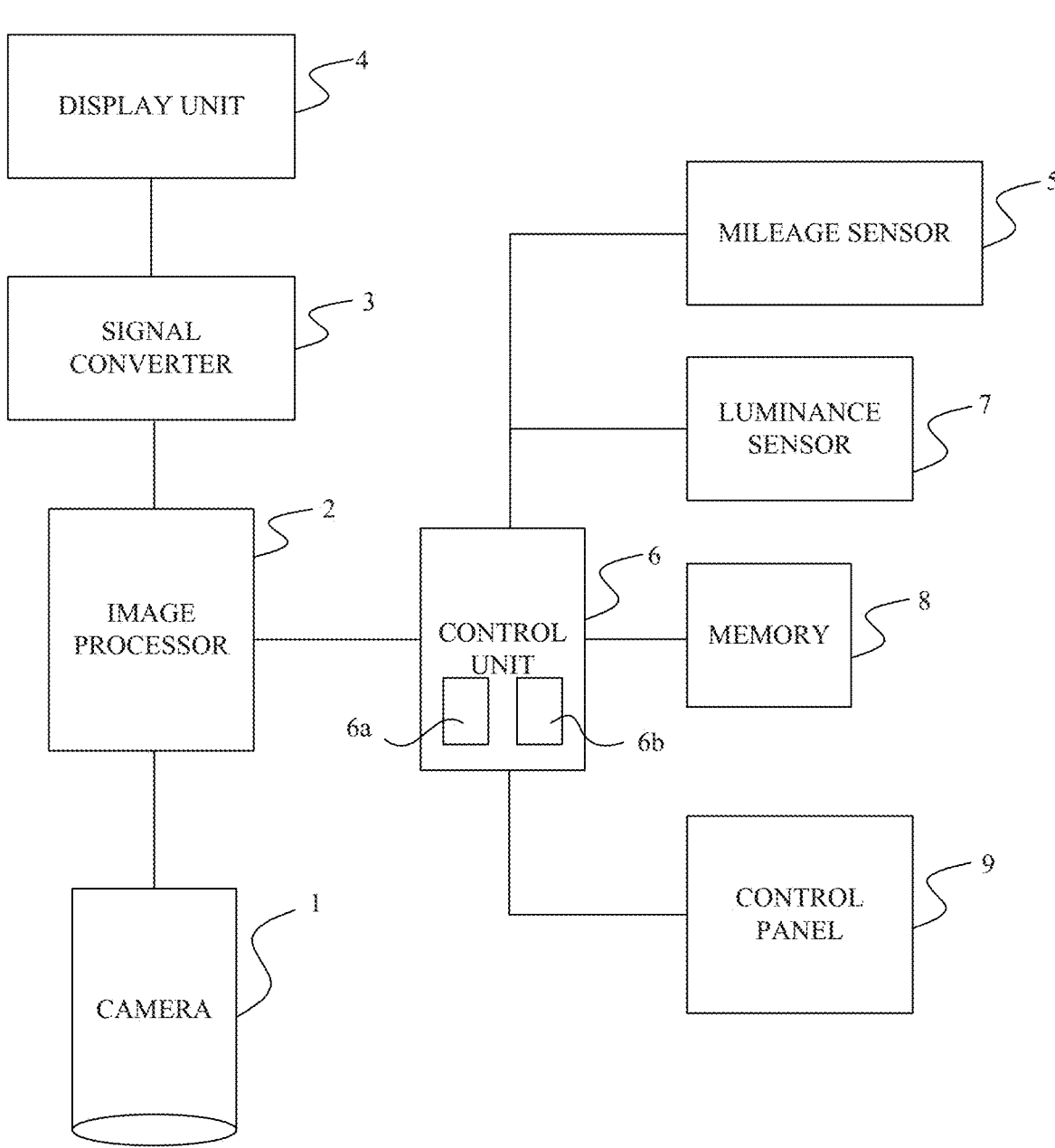
FIG. 1 is a block diagram of a rearview apparatus according to a first embodiment.

Referring now to FIG. 1, a description will now be given of a rearview (check) apparatus (electronic mirror) 100 according to a first embodiment of the present disclosure. FIG. 1 is a block diagram of the rearview apparatus 100. The rearview apparatus 100 includes a camera (imaging unit) 1 attached to the rear or side of the vehicle, and displays a rearview image captured by the camera on the display unit so that the driver can check the rearview image. This embodiment can adjust the luminance (brightness) of the rearview image to be checked displayed on the display unit.

The camera 1 includes an image sensor such as a small charge-coupled device (CCD) sensor or a complementary metal oxide semiconductor (CMOS) sensor, a lens (optical system), and a communication interface, and is mounted on the rear or side of the vehicle facing the back. In other words, the camera 1 is disposed to move with the vehicle. In operation of the camera 1, the light incident from the lens is converted into an electric signal by the image sensor, and then the image signal is output as an image signal from the communication interface to an image processor 2.

The image processor 2 performs image processing for the image signal from the camera 1. Here, the image processing includes various types of processing such as luminance processing, color processing, contour cooperation processing, color conversion processing, etc. of the input image. Image-processed image signals are output to a signal converter 3. The signal converter 3 converts the image signal that has undergone image processing into an image signal that can be displayed on a display unit 4 and outputs the image signal to the display unit 4. The display unit 4 includes a thin and lightweight element such as an organic EL panel or a liquid crystal panel. The display unit 4 is installed in front of or on the side of or at a position where the driver sitting in the driving seat faces or can view, and is used to check the rearview of the vehicle.

A mileage sensor 5 can measure a traveling distance of the vehicle, and is connected to a control unit 6 such as a Central Processing Unit (CPU). A luminance sensor (brightness sensor) 7 can measure the luminance (brightness) around the vehicle and is connected to the control unit 6. A memory (recorder) 8 is connected to the control unit 6 and can record (store) measurement data of the luminance sensor 7 and measurement data of the mileage sensor 5 of the vehicle based on instructions from the control unit 6. The memory 8 can read the recorded measurement data based on an instruction from the control unit 6. The control panel 9 is connected to the control unit 6 and can output commands from the outside to the control unit 6. The control unit 6 is connected to and controls the image processor 2, detects a moving body based on an image acquired by the camera 1, and acquires a distance to the moving body.

The control unit 6 is mounted on a vehicle and configured to control the luminance of an image acquired by the camera 1 and displayed on the display unit 4. The control unit 6 includes an acquisition unit 6a and a determination unit 6b. The acquisition unit 6a acquires information about the position of the moving body in the image. The determination unit 6b determines the luminance of the image based on the position of the moving body.

Figure 2:
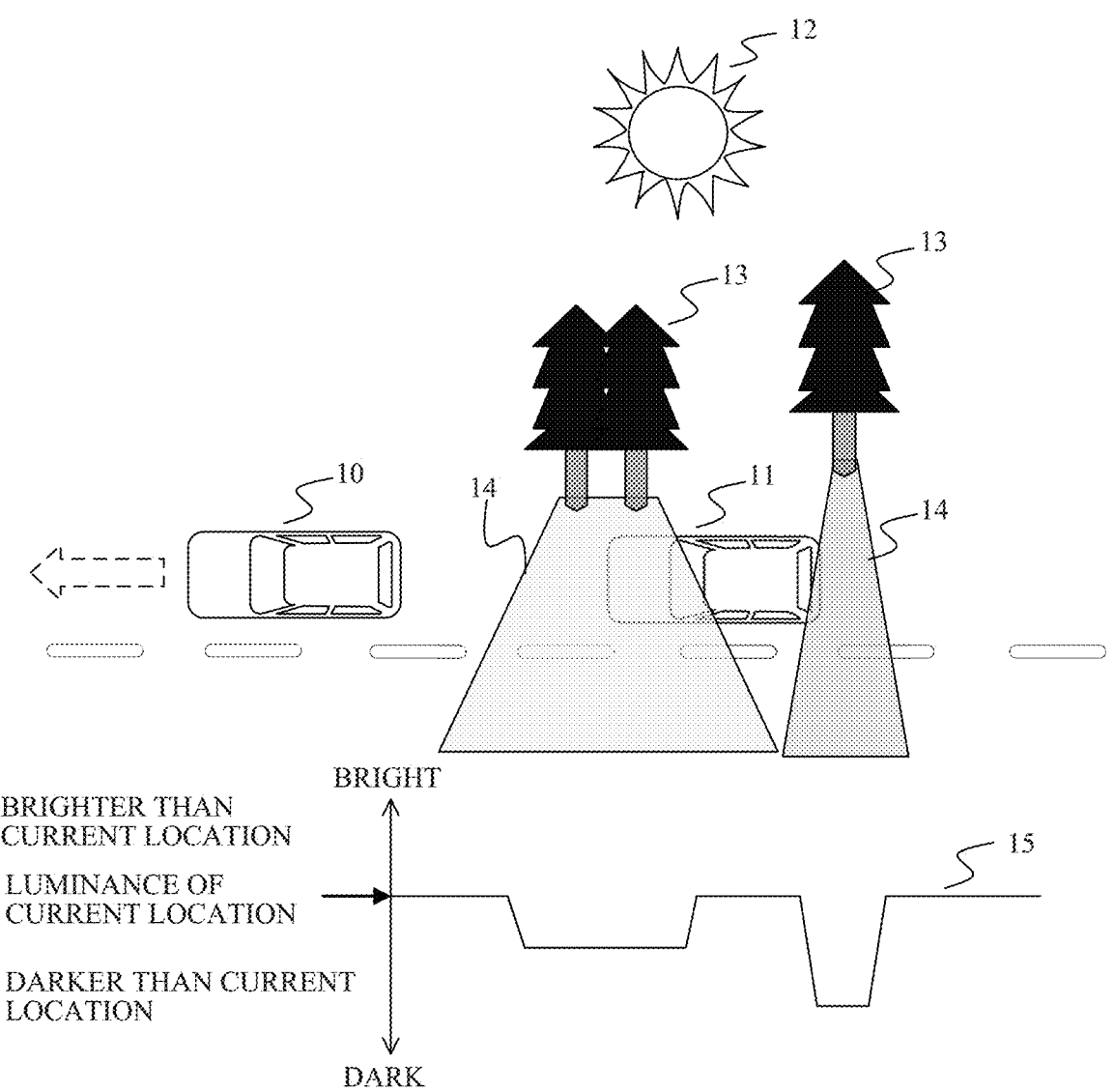
FIG. 2 is a schematic diagram of recorded data of a luminance sensor according to each embodiment.

Referring now to FIG. 2, a description will be given of an overview of the measurement data (recorded data) of the luminance sensor 7 recorded in the memory 8. FIG. 2 is a schematic diagram of the recorded data of the luminance sensor 7. FIG. 2 illustrates a state in which the rear vehicle 11 is running so as to follow a vehicle 10 of the user. A light source 12 is the sun, which emits intense light. A light shielding objects 13 produce shadows 14 by the light from the light source 12.

Luminance record data 15 is created by the control unit 6 using the measurement data (luminance information) of the luminance sensor 7 and the measurement data (driving information) of the mileage sensor 5, and includes the luminance value (brightness value) and the position information starting from the current location. In FIG. 2, the vehicle 10 of the user is running in an arrow direction (from right to left), and the luminance record data 15 has the state of the current location and information obtained during the traveling process. The acquired recorded data is associated with the moving information (driving information) obtained from the mileage sensor 5, and is stored in the memory 8 in which the current luminance and the luminance data in the past travels can be compared as correction reference data.

Figure 3:
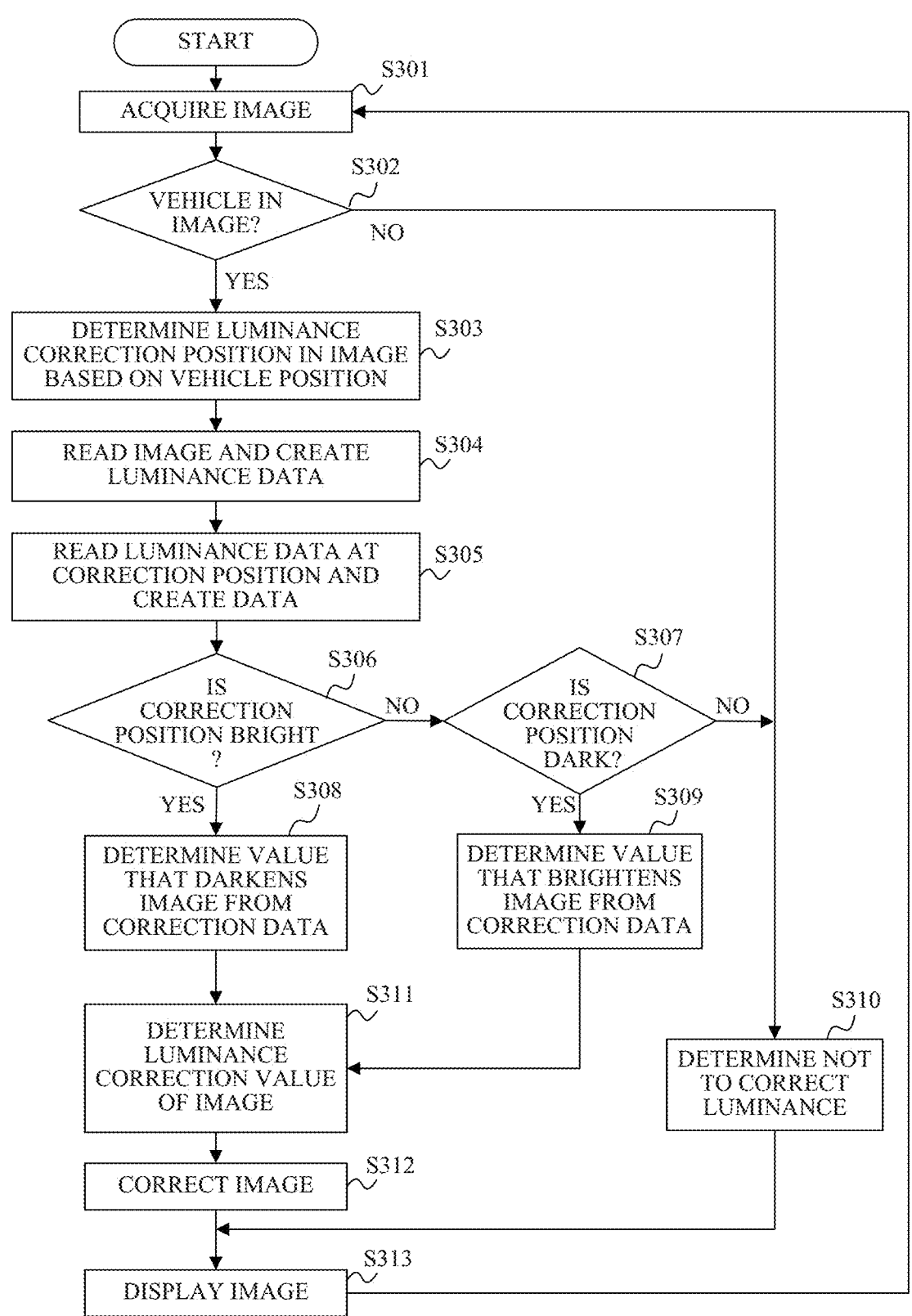
FIG. 3 is a flowchart illustrating the operation of the rearview apparatus according to the first embodiment.

Referring now to FIG. 3, a description will be given of the operation of the rearview apparatus 100 according to this embodiment. FIG. 3 is a flowchart illustrating the operation of the rearview apparatus 100. First, in step S301, the image processor 2 acquires an image (image data) behind the vehicle, captured by the camera 1. Next, in step S302, the control unit 6 determines whether or not the image (image data) input to the image processor 2 includes a moving body (vehicle). In this embodiment, the moving body is the rear vehicle, but it is not limited to this example. In a case where the control unit 6 determines in step S302 that the rear vehicle exists in the image, the processing of step S303 is executed. On the other hand, in a case where the control unit 6 determines that the rear vehicle does not exist in the image, the processing of step S310 is executed.

In step S303, the control unit 6 determines luminance correction reference coordinates (luminance correction position) based on the information (vehicle position) regarding the position of the rear vehicle in the image. Next, in step S304, the control unit 6 creates current luminance data based on the current image obtained in step S301. Next, in step S305, as illustrated in FIG. 2, the control unit 6 creates correction data (correction reference data) at the correction position determined in step S303 using the recorded data relating to the luminance data obtained from the mileage and driving process, which are stored in the memory 8. Next, in step S306, the control unit 6 determines whether or not the current luminance data created in step S304 is brighter than the correction reference data created in step S305 at the correction position. In a case where the control unit 6 determines that the current luminance data at the correction position is brighter than the correction data, the processing of step S308 is executed. On the other hand, in a case where the control unit 6 determines that the current luminance data at the correction position is darker than or equal to the correction data, the processing of step S307 is executed.

In step S308, the control unit 6 determines a correction value for darkening the rearview image based on the correction data. In step S307, the control unit 6 determines whether or not the current luminance data created in step S304 is darker than the correction data created in step S305 at the correction position. In a case where the control unit 6 determines that the current luminance data is darker than the correction data, the processing of step S309 is executed. On the other hand, in a case where the control unit 6 determines the other state (in which the current luminance data and the correction data are equivalent luminance states), the processing of step S310 is executed.

In step S309, the control unit 6 determines a correction value for brightening the rearview image based on the correction data. In step S310, the control unit 6 determines not to correct the luminance of the rearview image. In step S311, the control unit 6 records in the memory 8 the correction value (luminance correction value of the captured image) determined in step S308 or S309. Next, in step S312, the control unit 6 controls the image processor 2 to correct (the luminance of) the rearview image obtained in step S301 using the correction values recorded in the memory 8. Next, in step S313, the control unit 6 controls the image processor 2 to output the rearview image whose luminance has been corrected in step S311 or the uncorrected rearview image in step S310 to the signal converter 3. The image converted by the signal converter 3 is displayed on the display unit 4.

After the processing of step S313 is executed, the flow returns to step S301, and the processing of steps S301 to S313 are repeated.

This embodiment corrects the luminance, realizes the proper luminance for an image for checking the rear vehicle displayed on the display unit 4 for rearview check (luminance of the image at the position of the rear vehicle), and improves the visibility for the rear vehicle in checking the rearview.

Second Embodiment

Figure 4:
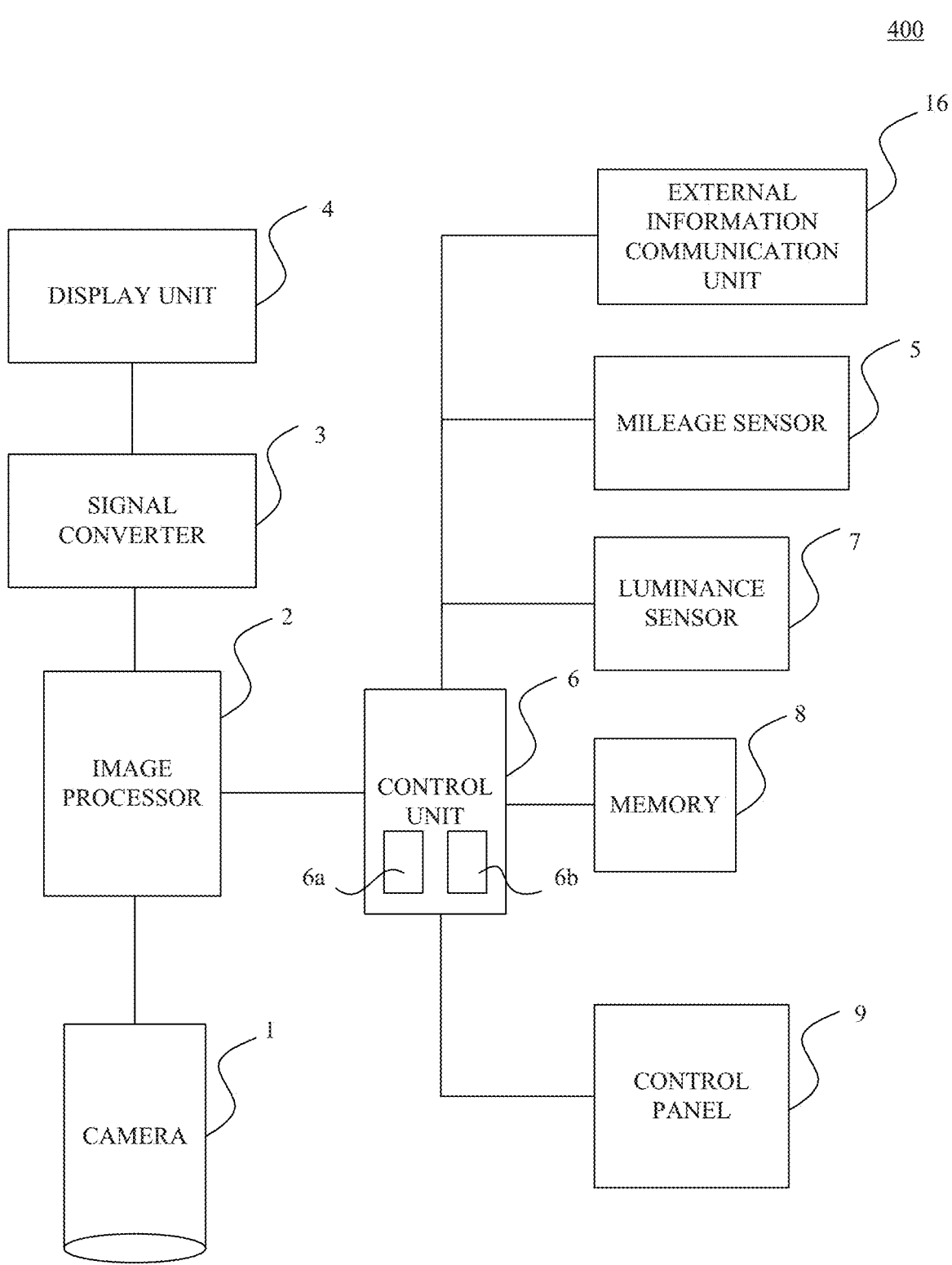
FIG. 4 is a block diagram of a rearview apparatus according to a second embodiment.

Referring now to FIG. 4, a description will be given of a rearview apparatus (electronic mirror) 400 according to a second embodiment of the present disclosure. FIG. 4 is a block diagram of the rearview apparatus 400. The rearview apparatus 400 according to this embodiment is different from the rearview apparatus 100 according to the first embodiment in that it has an external information communication unit 16. Since the rest of the basic configuration of the rearview apparatus 400 is similar to that of the rearview apparatus 100, a description thereof will be omitted.

The external information communication unit 16 is a communication unit that can acquire information about the position of a moving body such as another vehicle and a pedestrian around this vehicle measured by an external measuring apparatus such as road infrastructure from the external measuring apparatus through wireless communication. The memory 8 is connected to the control unit 6, and the control unit 6 can record the measurement information about the luminance sensor 7 and the mileage sensor 5 of the vehicle, and the inter-vehicle information with the other vehicle obtained by the external information communication unit 16. The control unit 6 can read the recorded information from the memory 8.

Figure 5:
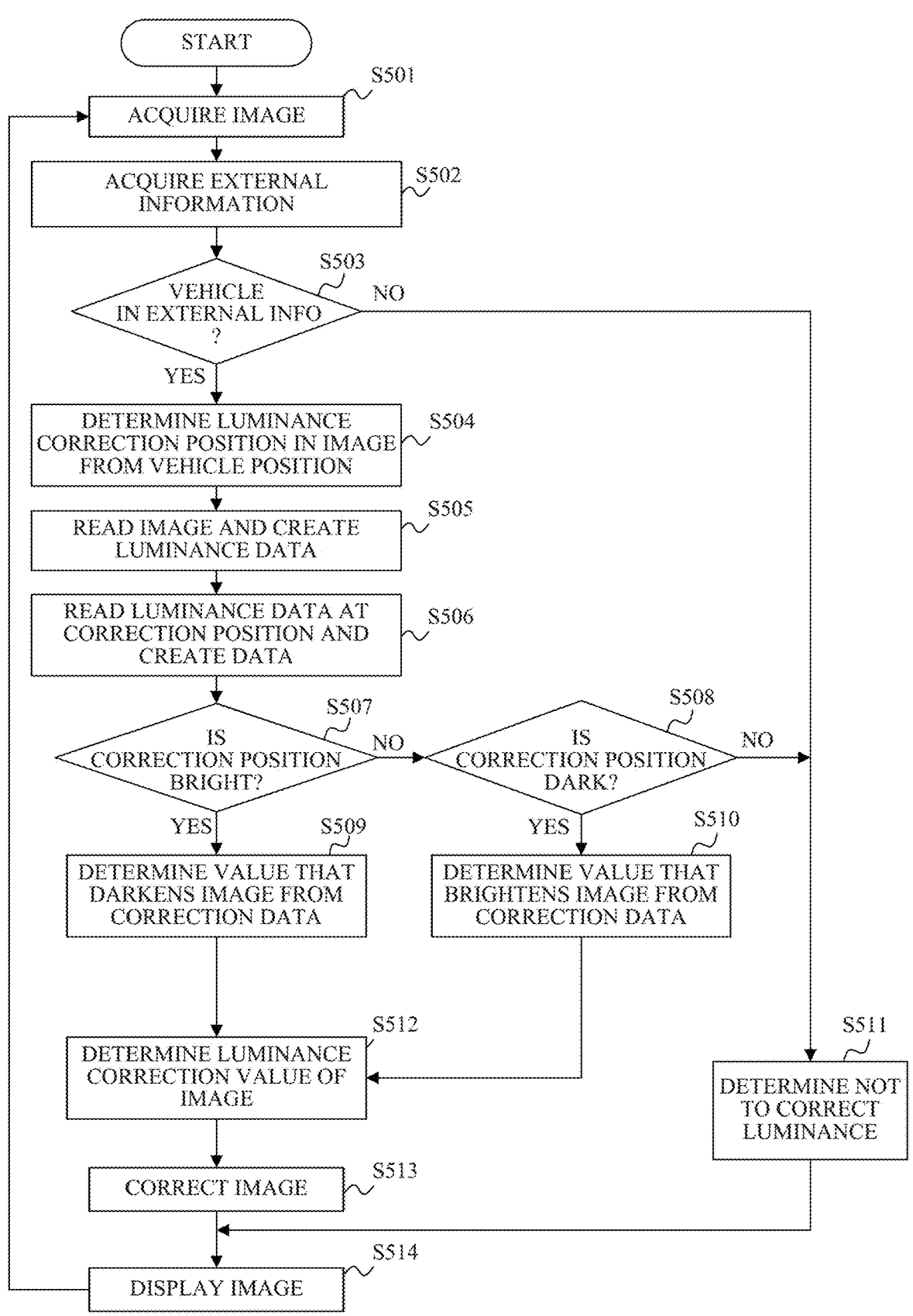
FIG. 5 is a flowchart illustrating the operation of the rearview apparatus according to the second embodiment.

Referring now to FIG. 5, a description will be given of the operation of the rearview apparatus 400 according to this embodiment. FIG. 5 is a flowchart illustrating the operation of the rearview apparatus 400.

First, in step S501, the image processor 2 acquires an image of the rear of the vehicle (rearview image) captured by the camera 1. Next, in step S502, the control unit 6 acquires information (external information about the vehicle, peripheral information about the vehicle) received by the external information communication unit 16. The information acquired by the control unit 6 is recorded in the memory 8. Next, in step S503, the control unit 6 extracts the information behind the vehicle (rearview information) among the information acquired from the external information communication unit 16 or the memory 8, and determines whether or not there is a moving body (vehicle) in the external information (rearview information). In this embodiment, the moving body is the rear vehicle, but this embodiment is not limited to this example. In a case where the control unit 6 determines in step S503 that a vehicle exists in the external information, the processing of step S504 is executed. On the other hand, in a case where the control unit 6 determines that the vehicle does not exist in the external information, the processing of step S511 is executed. Since steps S504 to S514 respectively correspond to steps S303 to S313 in FIG. 3 in the first embodiment, a description thereof will be omitted.

This embodiment can more accurately determine the position information about the rear vehicle by using the surrounding information (external information) of the vehicle of the user acquired from the external measurement apparatus such as road infrastructure. Thus, a position where the luminance correction is to be performed becomes more suitable, and the visibility to the rear vehicle can be improved.

Third Embodiment

Figure 6:
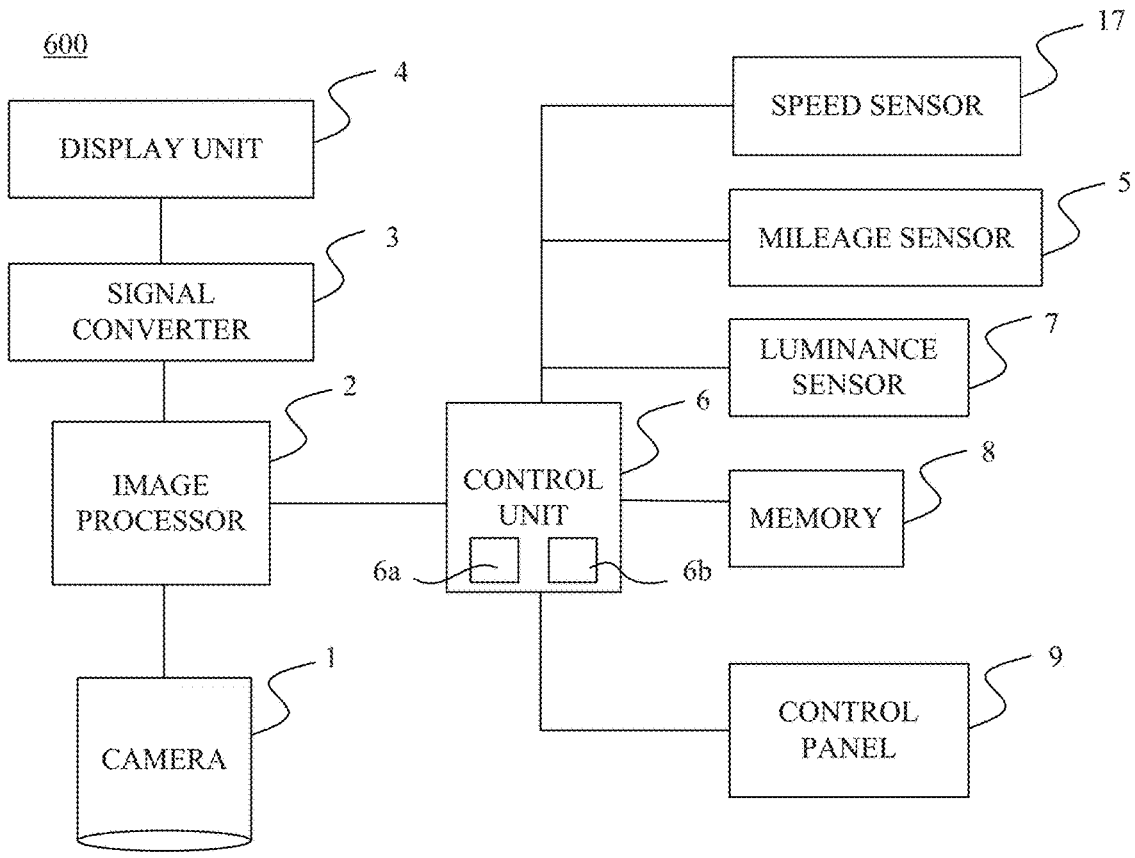
FIG. 6 is a block diagram of a rearview apparatus according to a third embodiment.

Referring now to FIG. 6, a description will be given of a rearview apparatus (electronic mirror) 600 according to a third embodiment of the present disclosure. FIG. 6 is a block diagram of the rearview apparatus 600. The rearview apparatus 600 according to this embodiment is different from the rearview apparatus 100 according to the first embodiment in that it has a speed sensor 17. Since the rest of the basic configuration of the rearview apparatus 600 is similar to that of the rearview apparatus 100, a description thereof will be omitted.

The speed sensor 17 is connected to the control unit 6 and measures the traveling speed of the vehicle of the user. The memory 8 is connected to the control unit 6 and can record the measurement data of the luminance sensor 7 and the measurement data of the mileage sensor 5 of the vehicle. The control unit 6 can read data recorded in the memory 8. The memory 8 stores a vehicle-to-vehicle data table corresponding to the driving speed of the own vehicle. The control unit 6 can read inter-vehicle data corresponding to the speed of the own vehicle from the memory 8.

Figure 7:
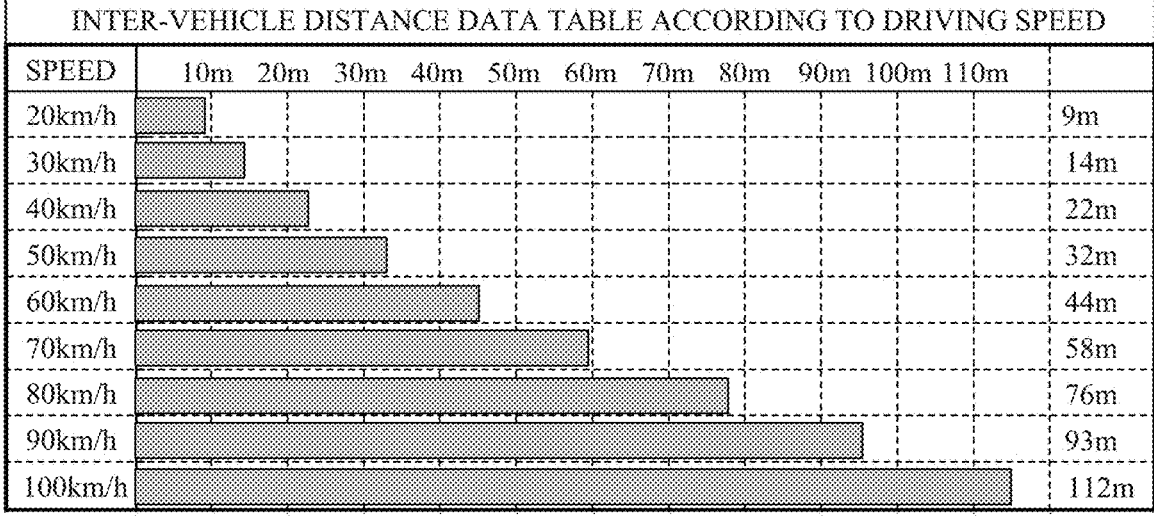
FIG. 7 illustrates an example of a data table illustrating a relationship between driving speed and a distance between vehicles according to the third embodiment.

FIG. 7 illustrates an example of a data table illustrating a relationship between a driving speed and a distance between vehicles. This data table indicates, for example, that the distance between vehicles is 44 m for a speed of 60 km/h and the distance between vehicles is 76 m for a speed of 80 km/h. The data table is recorded in the memory 8, for example. The distance between vehicles for each of all speeds may be recorded.

Figure 8:
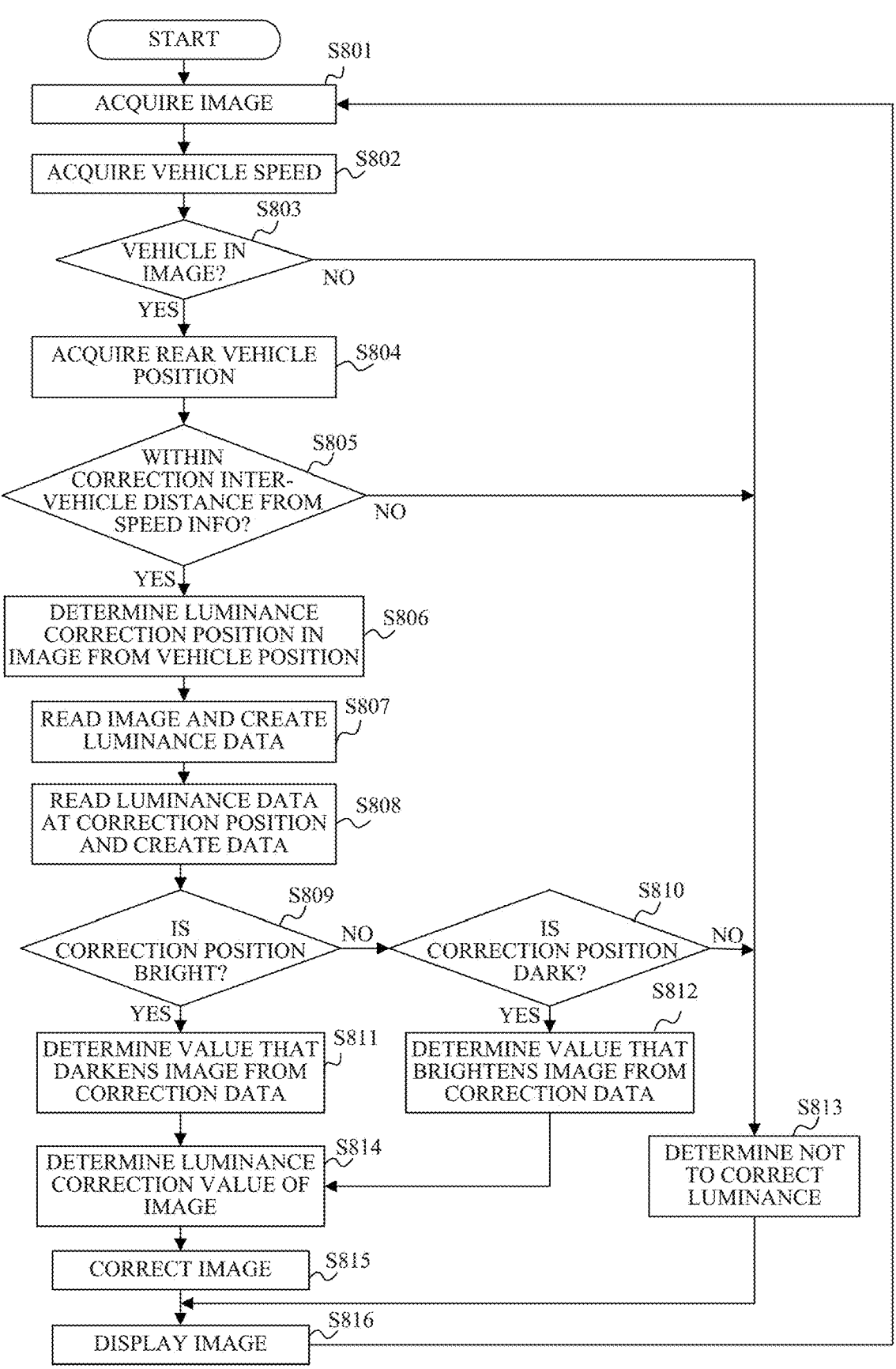
FIG. 8 is a flowchart illustrating the operation of the rearview apparatus according to the third embodiment.

Referring now to FIG. 8, a description will be given of the operation of the rearview apparatus 600 according to this embodiment. FIG. 8 is a flowchart illustrating the operation of the rearview apparatus 600.

First, in step S801, the image processor 2 acquires a rearview image of the vehicle captured by the camera 1. Next, in step S802, the control unit 6 acquires the current vehicle speed (driving speed) from the speed sensor 17. Next, in step S803, the control unit 6 determines whether or not a moving body (vehicle) exists in the image (rearview image) input to the image processor 2. In this embodiment, the moving body is the rear vehicle, but it is not limited to this example. In a case where the control unit 6 determines in step S803 that the rear vehicle exists in the image, the processing of step S804 is executed. On the other hand, in a case where the control unit 6 determines that the rear vehicle does not exist in the image, the processing of step S813 is executed.

In step S804, the control unit 6 acquires the position of the rear vehicle. The position of the rear vehicle is acquired based on the image from the camera 1 or the speed information from the speed sensor 17. Alternatively, it may be acquired based on the external information from the external information communication unit 16 in the second embodiment. Next, in step S805, the control unit 6 reads out a distance between vehicles (inter-vehicle distance) corresponding to the speed information (driving speed) acquired in step S802 from the data table in the memory 8. The control unit 6 determines whether or not the position of the rear vehicle is within the range of the inter-vehicle distance (correction inter-vehicle distance, reference inter-vehicle distance) corresponding to the driving speed. In a case where the control unit 6 determines that the position of the rear vehicle is within the range of the correction inter-vehicle distance, the processing of step S806 is executed. On the other hand, in a case where the control unit 6 determines that the position of the rear vehicle is not within the range of the correction inter-vehicle distance, the processing of step S813 is executed. The subsequent steps S806 to S816 correspond to steps S303 to S313 in FIG. 3 described in the first embodiment, respectively, so a description thereof will be omitted.

This embodiment determines whether or not to perform luminance correction according to the inter-vehicle distance, and can improve the visibility for the rear vehicle because part of the correction operation becomes unnecessary.

In each embodiment, the memory 8 may record luminance information about an image obtained by imaging a part of the vehicle such as the hood. Alternatively, the memory 8 may record luminance information around the vehicle obtained by the luminance sensor 7. At this time, the luminance sensor 7 may be used together with the sensor for controlling the air conditioner of the vehicle.

In each embodiment, a vehicle is one type of moving apparatus, and each embodiment is applicable to another moving apparatus. The moving apparatus covers a car (automobile), a ship, a plane, a drone, a train etc. A moving body does not have to be located on the back of the moving apparatus, and may be located in any direction viewed from the moving apparatus.

OTHER EMBODIMENTS

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™), a flash memory device, a memory card, and the like.

Each embodiment can provide the control apparatus that can display an image with improved visibility of a target.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2022-123723, filed on Aug. 3, 2022, which is hereby incorporated by reference herein in its entirety.

What is claimed is:

1. A control apparatus to be moved with a moving apparatus and configured to control luminance of an image to be displayed on a display unit acquired by an imaging unit, the control apparatus comprising:

a memory storing instructions and luminance information about the image; and a processor configured to execute the instructions to:

obtain information about a position of a moving body in the image, determine the luminance of the image based on the position of the moving body, and determine the luminance of the image using luminance corresponding to the position of the moving body among the luminance information stored in the memory, wherein the memory stores the luminance information about the image in association with driving position information about the moving apparatus, and wherein the processor is configured to determine the luminance of the image based on first luminance of the image acquired from the imaging unit and second luminance stored in the memory, at the position of the moving body.

2. The control apparatus described in claim 1, wherein at the position of the moving body, the processor is configured to:

determine to reduce the luminance of the image in a case where the processor determines that the first luminance is higher than the second luminance, and determine to increase the luminance of the image in a case where the processor determines that the first luminance is lower than the second luminance.

3. An apparatus comprising:

an imaging unit;

a display unit; and a control apparatus configured to control luminance of an image to be displayed on the display unit acquired by the imaging unit, wherein the control apparatus includes:

a memory storing instructions and luminance information about the image; and a processor configured to execute the instructions to:

obtain information about a position of a moving body in the image, and determine the luminance of the image based on the position of the moving body, and determine the luminance of the image using luminance corresponding to the position of the moving body among the luminance information stored in the memory, wherein the memory stores the luminance information about the image in association with driving position information about the moving apparatus, and wherein the processor is configured to determine the luminance of the image based on first luminance of the image acquired from the imaging unit and second luminance stored in the memory, at the position of the moving body.

4. A control method configured to control luminance of an image to be displayed on a display unit acquired by an imaging unit, the control method comprising the steps of:

obtain information about a position of a moving body in the image, and determine the luminance of the image based on the position of the moving body, determining the luminance of the image using luminance corresponding to the position of the moving body among luminance information stored in a memory, the luminance information being stored in association with driving position information about a moving apparatus; and determining the luminance of the image based on first luminance of the image acquired from the imaging unit and second luminance stored in the memory, at the position of the moving body.

5. A non-transitory computer-readable storage medium storing a program that causes a computer to execute the control method according to claim 4.

\*  \*  \*  \*  \*